United States Patent [19]
Miyairi

[11] Patent Number: 4,532,581
[45] Date of Patent: Jul. 30, 1985

[54] CIRCUIT FOR REDUCING HARMONICS AND PULSATION IN MULTIPLEX POLYPHASE RECTIFYING CIRCUITS OR INVERTERS, RESPECTIVELY PROVIDED WITH INTERPHASE REACTORS

[76] Inventor: Shota Miyairi, No. 5-3-10, Kamiuma, Setagaya-ku, Tokyo, Japan

[21] Appl. No.: 545,679

[22] Filed: Oct. 26, 1983

[30] Foreign Application Priority Data

May 19, 1983 [JP] Japan ............................ 58-86579

[51] Int. Cl.$^3$ ................................................ H02J 1/02
[52] U.S. Cl. .......................................... 363/39; 363/37; 363/64
[58] Field of Search ................................... 363/34–37, 363/39, 44–48, 51, 64, 128–129, 135–137; 323/209, 210, 211

[56] References Cited

U.S. PATENT DOCUMENTS

3,703,680 11/1972 Frank et al. ........................ 323/210
4,247,888 1/1981 Angquist ............................ 363/37 X

FOREIGN PATENT DOCUMENTS

0570168 8/1977 U.S.S.R. .............................. 363/136

Primary Examiner—Peter S. Wong

[57] ABSTRACT

A circuit for reducing harmonics in the current on AC side and the pulsation in the voltage on DC side in a multiplex polyphase rectifying circuit or an inverter, each having an interphase reactor and plural rectifying circuits, wherein a plural number of taps is provided either on said interphase reactor or on the secondary windings thereof which is directly connected with the central point of the interphase reactor on the central point thereof, and the taps are connected to the DC circuit respectively via rectifying elements.

6 Claims, 10 Drawing Figures

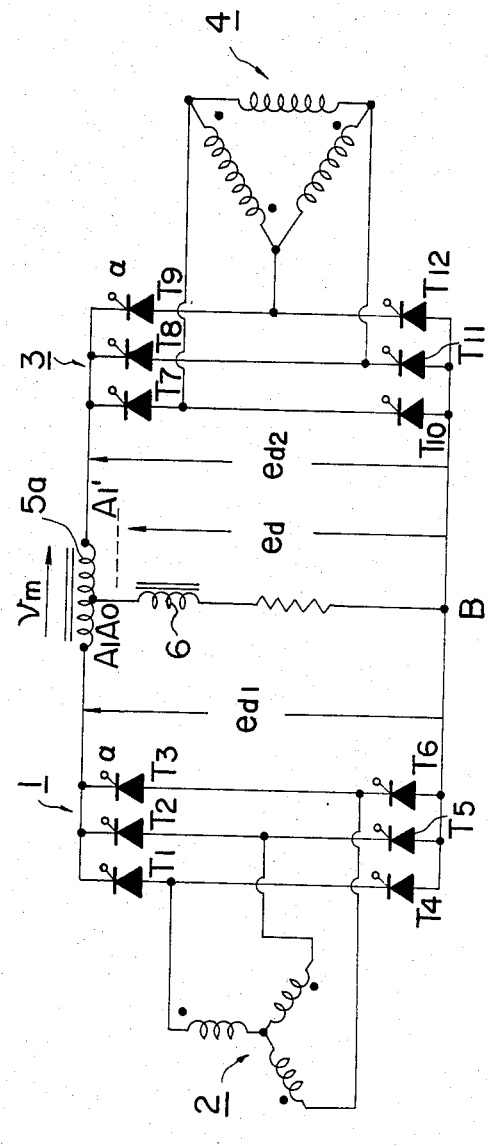
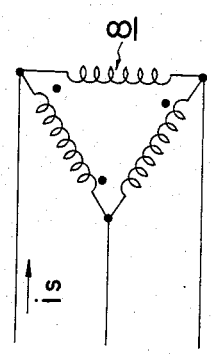
FIG. 1
PRIOR ART

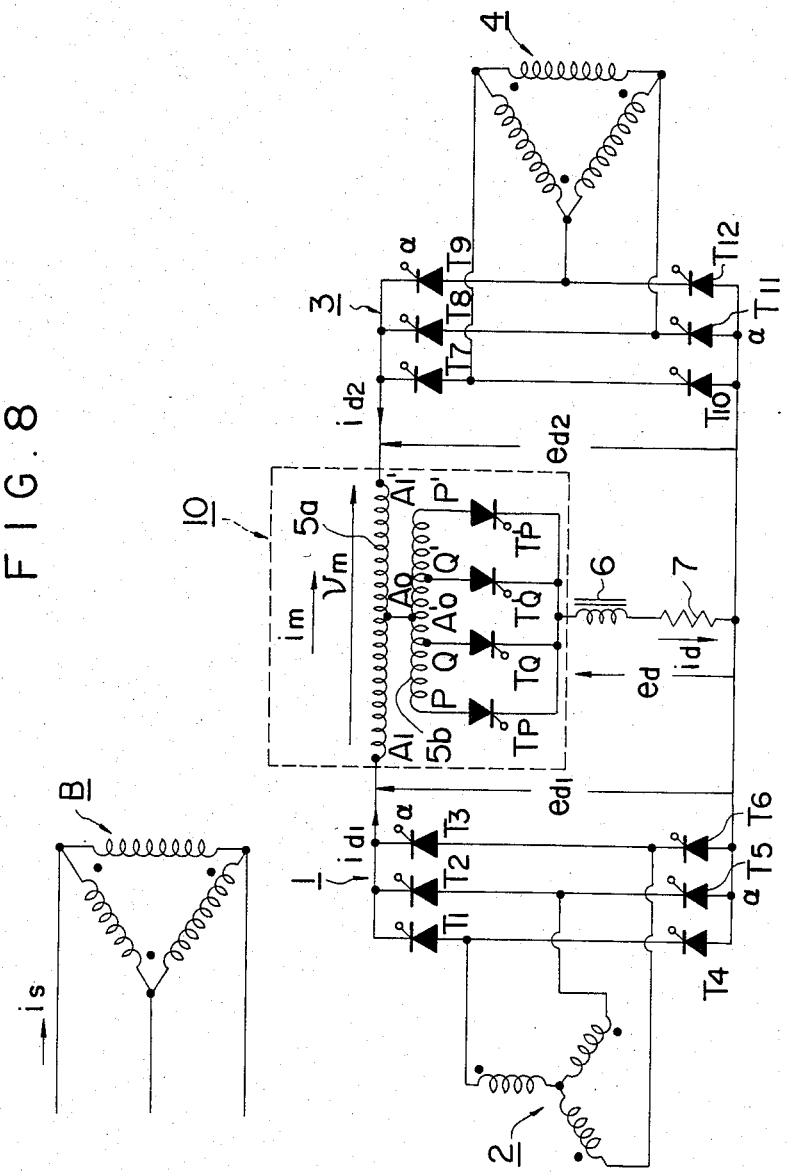

4,532,581

CIRCUIT FOR REDUCING HARMONICS AND PULSATION IN MULTIPLEX POLYPHASE RECTIFYING CIRCUITS OR INVERTERS, RESPECTIVELY PROVIDED WITH INTERPHASE REACTORS

BACKGROUND OF THE INVENTION

The present invention relates to a harmonic and pulsation reducing circuit in a multiplex polyphase rectifier circuit with an interphase reactor or an inverter with an interphase reactor and more particularly, relates to an improvement for reducing harmonics in the current on AC side and pulsations in the voltage on DC side of a multiplex polyphase rectifier or of an inverter, respectively having a multiplex polyphase rectifier circuit.

As rectifiers have become more popular and the capacity thereof has increased in recent years, harmonics from a rectifier causes often a serious problem in electrical power transmission or distribution system. Although various countermeasures to solve the problem by increasing the number of phases or pulses of a rectifier or by using a filter have been proposed, they are not always desirable as they tend to push cost considerably.

Explanation is given first to a double three-phase 12-pulse rectifier with an interphase reactor which comprises star connections and delta connections in combination.

FIG. 1 is a circuit diagram of a well-known double three-phase 12-pulse rectifier of such a type. As shown in the figure, a three-phase bridge rectifier circuit 1 having 6 thyristors $T_1$ to $T_6$ as rectifying elements is connected to one of the secondary windings in star connection of a transformer, while a three-phase bridge rectifier circuit 3 having 6 thyristors $T_7$ to $T_{12}$ as the rectifying elements is similarly connected to the other secondary winding 4 in delta connection of the transformer. Both three-phase bridge rectifier circuit 1 and 3 are connected to each other via the end portions $A_1$, $A'_1$ of an interphase reactor 5a to supply DC current to a load 7 which is connected via a smoothing reactor 6 to the central point A of the interphase reactor 5a. The reference numeral 8 denotes a primary winding of the transformer.

The waveforms of the voltage $e_d$ between terminals $A_0$ and B of the voltage $\nu m$ which is to be applied to the interphase reactor 5a at the normal operation of the double three-phase pulse rectifier may vary depending on the phase-control angles $\alpha$ of the thyristors $T_1$ to $T_{12}$. In short, when the control angle $\alpha$ is extremely small, the waveforms of the voltages $e_d$, $\nu m$ become as shown in FIG. 2(a), (c): the voltage $e_d$ includes the pulsation of $12f$ (f=power source frequency) shown in FIG. 2(b) and the voltage $\nu m$ becomes substantially triangular in waveforms. When the control angle $\alpha$ is large or close to 90°, the waveforms of the voltages $e_d$, $\nu m$ becomes as shown in FIG. 3(a) and (b). That is, the voltage $e_d$ is serrated and includes the pulsation of $12f$ while the voltage $\nu m$ becomes substantially rectangular.

The pulsation contained in the voltage $e_d$, for instance, of $12f$ in this case can be reduced in such a prior art only by increasing the number of phases or by using quadruple star zigzag connections as mentioned above.

SUMMARY OF THE INVENTION

In view of such conventional difficulties as mentioned above, the present invention aims at providing a harmonic and pulsation reducing circuit which can not only reduce the harmonics of the AC input current $i_s$ and pulsation of the voltage $e_d$ but also can control a reactive current by setting the control angle $\alpha$ of a rectifier at either close to 90° in lead or 90° in lag when applied to a multiplex polyphase rectifier having a multiplex polyphase rectifying circuit comprising plural rectifying circuits and an interphase reactor, an external commutated inverter of similar type, etc. In order to attain such objects, the present invention is characterized in that the interphase reactor is provided with plural taps symmetrically on both sides of the center point of the interphase reactor and the taps are connected respectively to a DC circuit via rectifying elements such as thyristers. The present invention is alternatively characterized in that an interphase reactor is provided with a secondary winding so as to directly connect the central point of the secondary winding with the central point of the interphase reactor, plural taps are provided symmetrically on both sides of the central point of the secondary winding, respective taps are connected to a DC circuit via rectifying elements such as thyristors.

BRIEF DESCRIPTION OF THE DRAWINGS

FIG. 1 is a circuit diagram to show a double three-phase rectifier of prior art.

FIG. 5(a) is an oscillogram to show the waveforms of $e_{d\alpha}$, $e_{d\beta}$ while

FIG. 8 is a circuit diagram to show another embodiment of this invention.

DETAILED DESCRIPTION OF THE PREFERRED EMBODIMENTS

Embodiments of this invention will now be described in detail referring to attached drawings.

Figure 2:
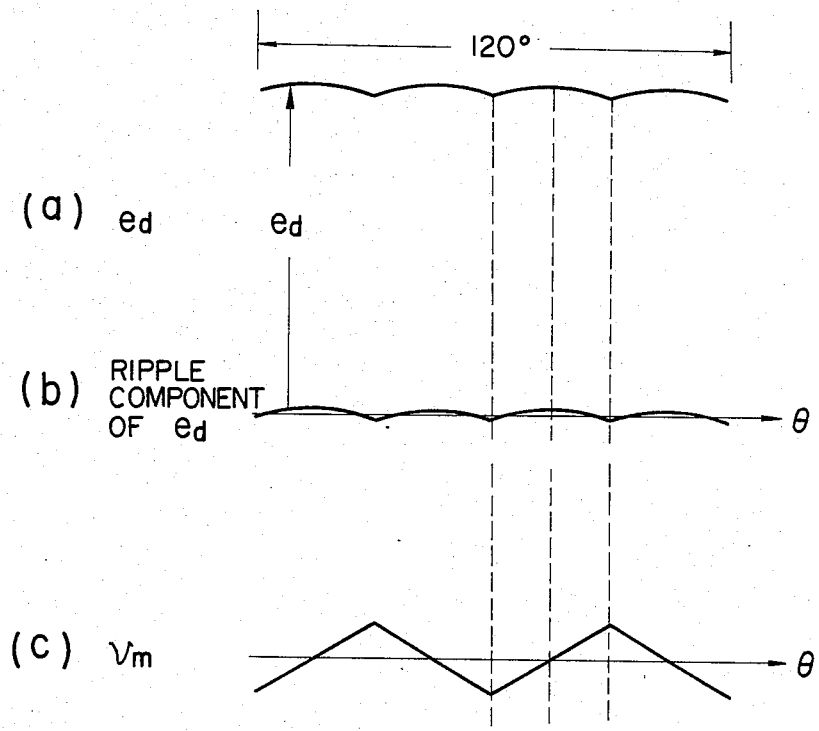
FIG. 2(a) and FIG. 3(a) show the waveforms of the DC output voltage of the circuit of FIG. 1. The former is on the case of comparatively small of the control angle $\alpha$ and the latter is on the case of comparatively large of the control angle $\alpha$.
FIG. 2(b) shows the waveform of the pulsation component thereof.
FIG. 2(c) and FIG. 3(b) show the waveforms of the voltage across the interphase reactors shown in FIG. 1.
Figure 3:
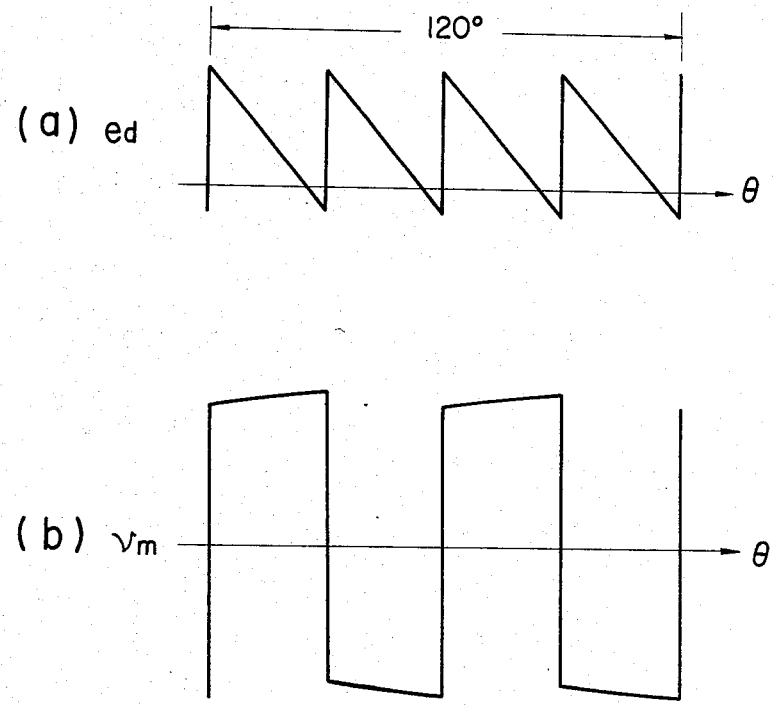
Figure 4:
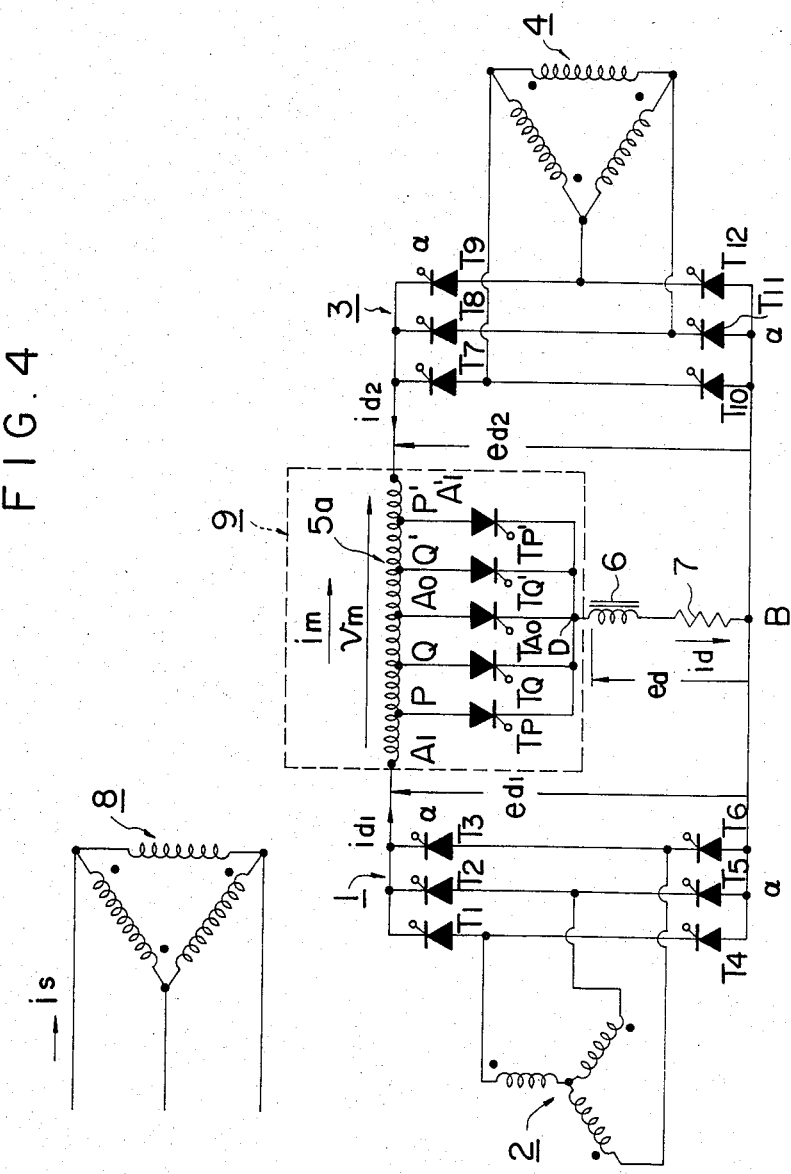
FIG. 4 is a circuit diagram to show an embodiment of the present invention applied to the double three-phase 12-pulse rectifier of FIG. 1.

FIG. 4 is a circuit diagram when an embodiment according to this invention is applied to a double three-phase 12-pulse rectifier. Identical parts are denoted with identical numerals with FIG. 1 to avoid duplication in description. As shown in FIG. 4, rectifying components $T_P \sim T_{P'}$ are connected to a DC circuit terminal D as shown in the portion 9 circled with broken lines. The circled portion 9 is the circuit for reducing harmonics and pulsation and this is the key part of this invention. Although in FIG. 4 five taps P,Q,$A_0$,Q',P' are shown, they are shown as merely a way of example. The taps may be only three, P,A₀,P' or may be more than five. The larger the number of the taps becomes, the more can the harmonics or the pulsations be reduced. The taps P,Q,A₀,Q',P' are connected to a DC circuit terminal D via rectifier elements $T_P, T_Q, T_{A0}, T_{Q'}, T_{P'}$ such as thyristors.

The operation of the circuit 9, key part of this invention, will now be described. In FIG. 4, let the number of turns of the windings $A_1A_0$ and $A_0A'_1$, $PA_0$ and $A_0P'$, $QA_0$ and $A_0Q'$ be $N_0, N_P, N_Q$, then $A_0$ comes at the central point of the interphase reactor 5a while taps P,P' and taps Q,Q' are positioned symmetrical in respect of the central point $A_0$. As the voltage $vm$ is appeared across the interphase reactor 5a, more than any one of the rectifier elements $T_P, T_Q, T_{A0}, T_{Q'}, T_{P'}$ can not be on the state of conduction at the same time if we disregard the overlapping at the commutation. This is because any inverse current can not flow through a rectifying element.

If it is assumed that any one $T_P$ of the rectifier elements $T_P, T_Q, T_{A0}, T_{Q'}, T_{P'}$ is on the conduction-state where this mode is referred to as the mode P, the relation shown below will hold in the voltage and current at the mode P.

This is disregarding the exciting current of the interphase reactor 5a, the relation below holds in FIG. 4 because of the condition of ampereturn cancellation.

$$i_{d1}(N_0 - N_P) = i_{d2}(N_0 + N_P) \atop i_{d1} + i_{d2} = i_d \Bigg\} \quad (1)$$

where, $i_{d1}, i_{d2}$ are the currents which flow from the rectifier circuits 1, 3 to the interphase reactor 5a $i_d$ is a load current. Owing to the smoothing reactor 6 in FIG. 4, $i_d$ is a comparatively smooth direct current with no ripple.

The relation below can be obtained from the equation (1).

$$i_{d1} = \frac{N_0 + N_P}{2N_0} i_d = \frac{1}{2} i_d + \frac{N_P}{2N_0} i_d = \frac{1}{2} i_d + i_m \atop i_{d2} = \frac{N_0 - N_P}{2N_0} i_d = \frac{1}{2} i_d - \frac{N_P}{2N_0} i_d = \frac{1}{2} i_d - i_m \Bigg\} \quad (2)$$

Provided, $$i_m = \frac{N_P}{2N_0} i_d \quad (3)$$

The current $i_m$ defined by the equation (3) is a circulating current which does not flow through a load circuit but circulates in the rectifier circuits 1, 3 via the interphase reactor 5a. That is the current contrived by the present invention, which will greatly contribute for improving the waveforms of the AC input current $i_s$.

The output voltage $e_d$ shown in FIG. 4 has the relation shown below:

$$e_d = e_{d1} + \frac{N_0 - N_P}{2N_0} vm \atop vm = e_{d2} - e_{d1} \Bigg\} \quad (4)$$

From equation (4), we have the following.

$$e_d = \frac{1}{2}(e_{d1} + e_{d2}) + \frac{N_p}{2N}(e_{d1} - e_{d2}) \quad (5)$$

$$= e_{d\alpha} + e_{d\beta}$$

where, $e_{d\alpha}$ and $e_{d\beta}$ are defined as below.

$$e_{d\alpha} = \frac{1}{2}(e_{d1} + e_{d2}) \atop e_{d\beta} = \frac{N_P}{2N_0}(e_{d1} - e_{d2}) = \frac{N_P}{2N_0} vm \Bigg\} \quad (6)$$

The $e_{d\alpha}$ in the equation (6) becomes the output voltage from the rectifier with an interphase reactor of a conventional type while the $e_{d\beta}$ the voltage generated by the application of the embodiment of this invention, which is the component which helps to reduce the pulsation of the output voltage $e_d$.

The voltage and the current during other modes can be obtained by replacing the $N_P$ in the equations (1) through (6) with follows.

| at Mode Q  | $N_P \to N_Q$  |
|------------|----------------|
| at Mode $A_0$ | $N_P \to 0$  |
| at Mode Q' | $N_P \to -N_Q$ |
| at Mode P' | $N_P \to -N_P$ |

In the period $vm > 0$, the mode can be shifted by natural commutation from the left mode to right mode in FIG. 4, that is, P→Q→A₀→Q'→P', while in the period $vm < 0$, P'→Q'→A₀→Q→P.

Figure 5A:
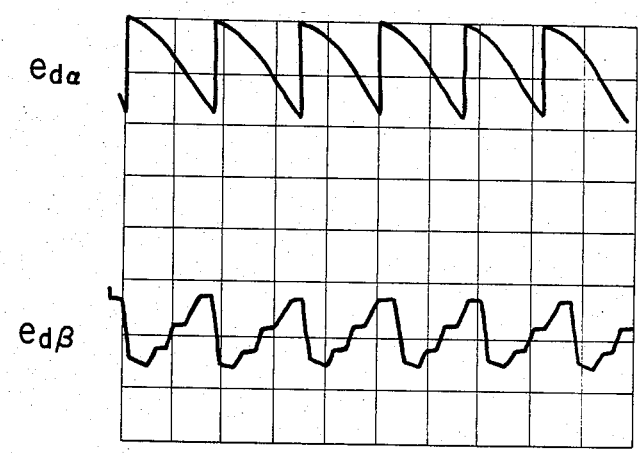
Figure 5B:
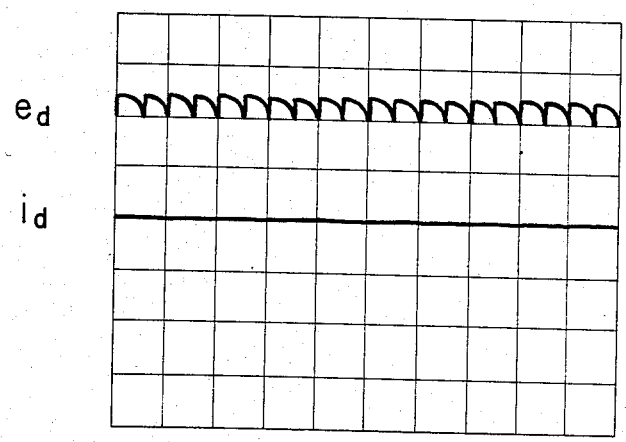
FIG. 5(b) is an oscillogram to show the waveforms of $e_d$, $i_d$.
Figure 6A:
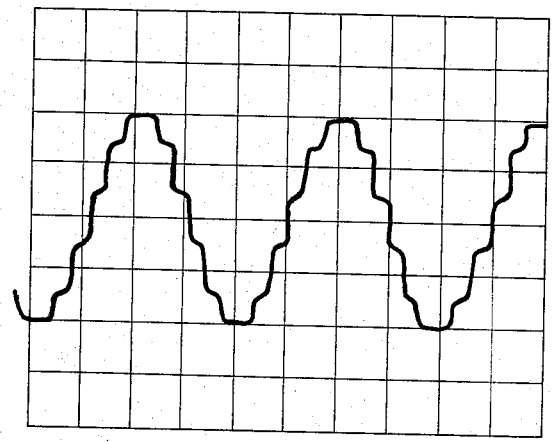
FIG. 6(a) is an oscillogram to show the waveform of the AC input current $i_s$ from the double three-phase 12-pulse rectifier which is not provided with the circuit according to this invention.
Figure 6B:
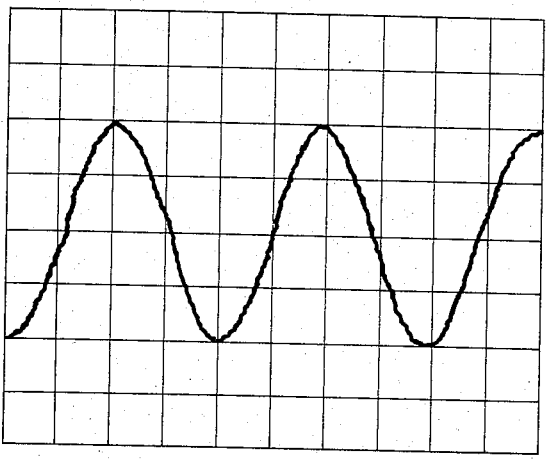
FIG. 6(b) is an oscillogram to show the waveform of $i_s$ when the circuit according to this invention is applied.

FIG. 5(a) and (b) and FIG. 6(a) and (b) are showing the respective waveforms of $e_{d\alpha}, e_{d\beta}, e_d$ and $i_d$ in FIG. 4 of a double three-phase 12-pulse rectifier with a circuit of this invention. It should be noted that if we do not apply this invention, the waveshape of output voltage $e_d$ of FIG. 5(b) must be replaced with $e_{d\alpha}$ of FIG. 5(a). FIG. 6(b) is showing the oscillogram showing the waveform of input current $i_s$ in FIG. 4, while FIG. 6(a) is that of the same circuit except the application of the circuit of this invention.

Referring to those oscillograms, it is evident that the pulsation in the DC output voltage $e_d$ and the harmonics in the AD input current $i_s$ can be remarkably reduced respectively, and this is due to the application of this invention.

The conditions for obtaining the result shown in FIG. 6 are as follows:

(1) The control angles α of rectifiers 1, 3 were set at 30°.

(2) A tap $A_0$ was not used but four taps P,Q,Q',P' were used and the windings thereof were determined as $$\frac{N_Q}{N_0} = 0.2, \frac{N_P}{N_0} = 0.6.$$

Figure 7:
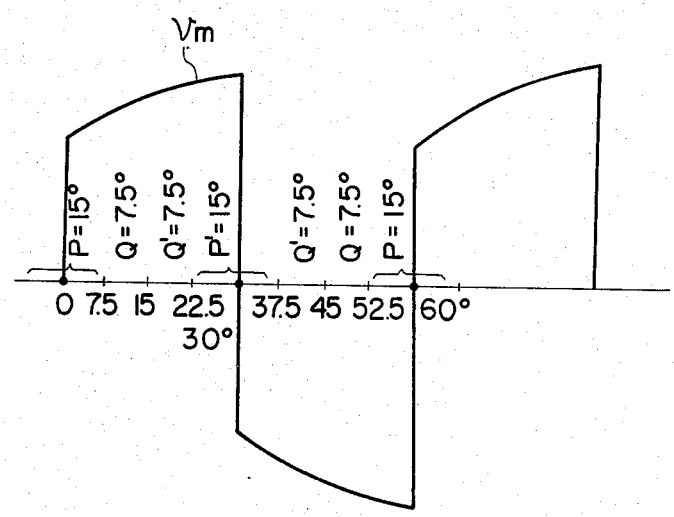
FIG. 7 is an explanatory view of an embodiment where the mode periods of P,Q,Q',P' are distributed in respect to $\nu m$.

(3) The sections of the modes P,Q,Q',P' are distributed in respect of $vm$ as shown in FIG. 7.

FIG. 8 shows another embodiment of the circuit according to this invention. As shown in the circuit 10 of this figure, a secondary winding 5b is provided on an interphase reactor 5a so as to directly connect the central points thereof $A_0$ and $A'_0$. Plural taps P,Q,Q',P' are provided symmetrically on both sides of the central point A'$_0$ of the secondary winding 5b. Respective taps P,Q,Q',P' are connected to a DC circuit via rectifying elements $T_P, T_Q, T_{Q'}, T_{P'}$ as shown in the figure.

Needless to say, this embodiment is as effective as the one shown hereinabove.

In order to avoid duplication in description, identical parts in FIG. 8 are denoted by identical numerals with FIG. 4.

As the rectifying elements in both embodiments, turn-off thyristors (GTO), power transistors, etc. as well as usual thyristor may be used. Moreover a diode also cn be used but the number of tap must be limited to only two for the natural commutation where controlling of DC output voltage is of no necessity and therefor diodes can be used as rectifier elements in main circuit 1 and 3 in FIG. 4.

As is described in the foregoing with reference to embodiments, this invention can be remarkably effective to the reduction of not only the harmonic current on the primary side but also the pulsation of a DC voltage. It has been already known that a multiplex polyphase rectifier circuit may function as a variable reactor or an external commutated inverter as well as a rectifier by setting the control angle $\alpha$ at a suitable value. For example, the control angle $\alpha$ is $0 \leq \alpha < 90°$ in the case where we make it function as a rectifier, is close to 90° in the case where we make it function as a branch reactor and is $90° < \alpha < 150°$ in the case where we make it function as an external commutated inverter. In this case, if we apply this invention to these circuits, we are able to have a reactor or inverter such as being successful in regard to waveshape of input current for the reactor or that of output voltage for the inverter.

I claim:

1. A circuit for reducing harmonics in the current on AC side and pulsation in the voltage on DC side in a multiplex polyphase rectifying circuit or an inverter, each having an interphase reactor and plural rectifying circuits, said interphase reactor being provided with a plural number of taps to be respectively connected to a DC circuit via rectifying elements.

2. The circuit as claimed in claim 1, wherein said plural rectifying circuits and rectifying elements comprise thyristors.

3. The circuit as claimed in claim 2, wherein said plural taps are provided symmetrically on both sides of the interphase reactor.

4. A circuit for reducing harmonics in the current on AC side and pulsation in the voltage on DC side in a multiplex polyphase rectifying circuit or an inverter, each having an interphase reactor with a central point and plural rectifying circuits, a secondary winding provided on said interphase reactors and having a central point directly connected to the central point of the interphase reactor, and a plural number of taps provided on the secondary winding and connected with DC circuits via respective rectifying elements.

5. The circuit as claimed in claim 4, wherein said plural rectifying circuits and said rectifying elements comprise thyristors.

6. The circuit as claimed in claim 5, wherein said plural taps are provided symmetrically to the central point of the interphase reactor.

* * * * *